US012761905B2

(12) United States Patent
Kotary et al.

(10) Patent No.: US 12,761,905 B2
(45) Date of Patent: Oct. 13, 2026

(54) FIRMWARE MANAGEMENT ENGINE FOR INTEGRATED SYSTEM MEMORY MANAGEMENT AND FIRMWARE PROVISIONING

(71) Applicant: Microsoft Technology Licensing, LLC, Redmond, WA (US)

(72) Inventors: Karunakara Kotary, Redmond, WA (US); Nagasubramanian Gurumoorthy, Leander, TX (US); Ankur Garg, Redmond, WA (US); Arun Venkatasubbaiah Hodigere, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 279 days.

(21) Appl. No.: 18/755,049

(22) Filed: Jun. 26, 2024

(65) Prior Publication Data

US 2026/0003606 A1 Jan. 1, 2026

(51) Int. Cl.

*G06F 8/656* (2018.01)
*G06F 8/65* (2018.01)
*G06F 9/455* (2018.01)

(52) U.S. Cl.

CPC ................ *G06F 8/656* (2018.02); *G06F 8/66* (2013.01); *G06F 9/45558* (2013.01); *G06F 2009/45575* (2013.01); *G06F 2009/45583* (2013.01)

(58) Field of Classification Search

CPC ........ G06F 8/656; G06F 8/66; G06F 9/45558; G06F 2009/45575; G06F 2009/45583

See application file for complete search history.

(56) References Cited

U.S. PATENT DOCUMENTS

2009/0119498 A1* 5/2009 Narayanan .......... G06F 12/0875 713/2
2014/0157264 A1* 6/2014 Russinovich ............. G06F 8/65 718/1

(Continued)

OTHER PUBLICATIONS

"Nil-migration", Retrieved from URL:https://web.archive.org/web/20230430091305/https://nil-migration.org/, Apr. 30, 2023, 10 Pages.

(Continued)

*Primary Examiner* — Ziaul A Chowdhury
(74) *Attorney, Agent, or Firm* — SHOOK, HARDY & BACON L.L.P.

(57) ABSTRACT

Methods, systems, and devices for providing firmware management using a firmware management engine of a cloud computing system are described. The firmware management engine supports using a hot-plugged memory (e.g., Compute Express Link (CXL) pooled memory) to temporarily migrate system memory (e.g., Central Processing Unit (CPU) local memory or CXL attached memory) of a server node, while performing firmware management operations (e.g., a firmware update) on the server node. The hot-plugged memory can be CXL pooled memory that is a shared at a rack level, the CXL pooled memory can be used to store system memory data of system memory while updating and activating new memory initialization firmware code. A virtual machine associated with the server node stays operational temporarily using the hot-plugged memory. Firmware management is performed on a server node while virtual machines associated with the server node and the system memory of the server node remain operational.

20 Claims, 11 Drawing Sheets

(56) References Cited

U.S. PATENT DOCUMENTS

| | | | | |
|---|---|---|---|---|
| 2020/0026556 | A1* | 1/2020 | Chitlur | G06F 12/1081 |
| 2022/0207193 | A1* | 6/2022 | Caraccio | G11C 11/2273 |
| 2024/0036848 | A1* | 2/2024 | Suryanarayana | G06F 9/4401 |

OTHER PUBLICATIONS

Extended European Search Report Received in European Patent Application No. 25185172.1, mailed on Nov. 13, 2025, 11 pages.

* cited by examiner

FIRMWARE MANAGEMENT ENGINE FOR INTEGRATED SYSTEM MEMORY MANAGEMENT AND FIRMWARE PROVISIONING

BACKGROUND

Users rely on computing environments with applications and services to accomplish computing tasks. Distributed computing systems host and support different types of applications and services in managed computing environments. In particular, the cloud computing systems operate based on server systems that include advanced computers or groups of computers that are dedicated to managing network resources and providing services to computing clients of the cloud computing systems. For example, server systems (e.g., web servers, file servers, database servers, applications servers, mail servers) functionality can include data storage, processing, management, and serving applications or resources computing clients. A server in a server system operates based on firmware that is specialized software that provides low-level control for the server's hardware component. Firmware can be stored in non-volatile memory (e.g., flash memory) with the hardware device. Firmware supports initialization, management, and operation of hardware components (e.g., memory).

SUMMARY

Various aspects of the technology described herein are generally directed to systems, methods, and computer storage media for, among other things, providing firmware management using a firmware management engine of a cloud computing system. The firmware management engine supports using a hot-plugged memory (e.g., Compute Express Link (CXL) pooled memory) to temporarily migrate system memory (e.g., Central Processing Unit (CPU) local memory or CXL attached memory) of a server node, while performing firmware management operations (e.g., a firmware update) on the server node. In particular, the hot-plugged memory can be CXL pooled memory that is a shared at a rack level, the CXL pooled memory can be used to store system memory data of system memory (i.e., memory data of CPU local memory or CXL attached memory) while updating and activating new memory initialization firmware code. A virtual machine associated with the server node stays operational temporarily using the hot-plugged memory. In this way, firmware management can performed on a server node while one or more virtual machines associated with the server node and the system memory of the server node remain operational.

Conventionally, cloud computing systems are not configured with a comprehensive computing logic and infrastructure to seamlessly update firmware for system memory (e.g., local Dynamic Random Access Memory "DRAM" and CXL-attached memory). Server system DRAM modules are typically connected either directly to the CPU memory controller or via the CPU CXL interface. In both scenarios, the memory initialization firmware typically runs only during system boot. This limitation is due to the intrusive nature of memory training, which involves adjusting memory parameters such as timing, voltage, and signal integrity to optimize performance. Cloud providers often adopt an update and activation model for memory initialization firmware code, which necessitates a server restart. This restart dependency presents challenges, especially in environments where uninterrupted service is paramount.

A technical solution—to the limitations of conventional cloud computing systems—can include providing firmware management resources via a firmware management system that supports firmware management in a cloud computing system. The firmware management resources can include hot-plugged memory (e.g., CXL pooled memory) shared at a rack level; and an orchestrator (e.g., fabric controller) and agent that facilitate providing a firmware update; and operations that enable: migrating system memory data (e.g., data in CPU local memory or CXL attached memory) and updating the firmware and activating new firmware using the firmware update. In addition, a virtual machine of a server node associated with the firmware update is frozen to stop operating with the system memory, and unfrozen to start operating with hot-plugged memory. Upon completion of firmware management operations for the system memory, the virtual machine is again frozen to stop operating with the hot-plugged memory; and unfrozen to start operating once again with the system memory.

In operation, a hot-plugged memory is attached to a server node. The server node is associated with a firmware update for a system memory storing system memory data. The system memory data is associated with a virtual machine (VM) of the server node. A first indication to freeze is communicated to the VM to stop the VM from operating with the system memory. The first indication to freeze enables migrating the system memory data to the hot-plugged memory. A first indication to unfreeze is communicated to the VM to start the VM operating with the system memory data in the hot-plugged memory. Update of the system memory using the firmware update is caused. An indication of an outcome of the update of the system memory is received. A second indication to freeze is communicated to the VM to stop the VM from operating with the hot-plugged memory. The second indication to freeze enables migrating hot-plugged memory data to the system memory. A second indication to unfreeze is communicated to the VM to start the VM operating with the hot-plugged memory data in the system memory.

In a second embodiment, a first indication to freeze a virtual machine (VM) is communicated to the VM to stop the VM from operating with system memory of a server node. The server node is associated with a firmware update for the system memory, the system memory comprises system memory data associated with the VM. The server node is attached to a hot-plugged memory. The system memory data is migrated to the hot-plugged memory. A first indication to freeze is communicated to the VM to stop the VM from operating with the system memory. The system memory data is migrated to the hot-plugged memory. A first indication to unfreeze is communicated to the VM to start the VM operating with the system memory data in the hot-plugged memory. Update of the system memory using the firmware update is caused. An indication of an outcome of the update of the system memory is received. A second indication to freeze is communicated to the VM to stop the VM from operating with the hot-plugged memory. The hot-plugged memory data is migrated to the system memory. A second indication to unfreeze is communicated to the VM to start the VM operating with the hot-plugged memory data in the system memory.

In a third embodiment, a first indication to freeze a virtual machine is received. The first indication to freeze stops the VM from operating with a system memory of a server node of the virtual machine. The first indication to freeze is associated with a firmware update for the server node and migration of system memory data in the system memory to a hot-plugged memory. The VM is frozen. A first indication to unfreeze the VM is received. The first indication to unfreeze starts the VM operating with the system memory data in the hot-plugged memory. The VM is unfrozen. A second indication to freeze the VM is received. The second indication to freeze stops the VM from operating with the hot-plugged memory. The second indication to freeze is associated with a signal indicating an outcome of the firmware update. The VM is frozen. A second indication to unfreeze is received at the virtual machine. The second indication to unfreeze starts the VM operating with the hot-plugged memory data in the system memory. The VM is unfrozen.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Overview

Figure 1A:
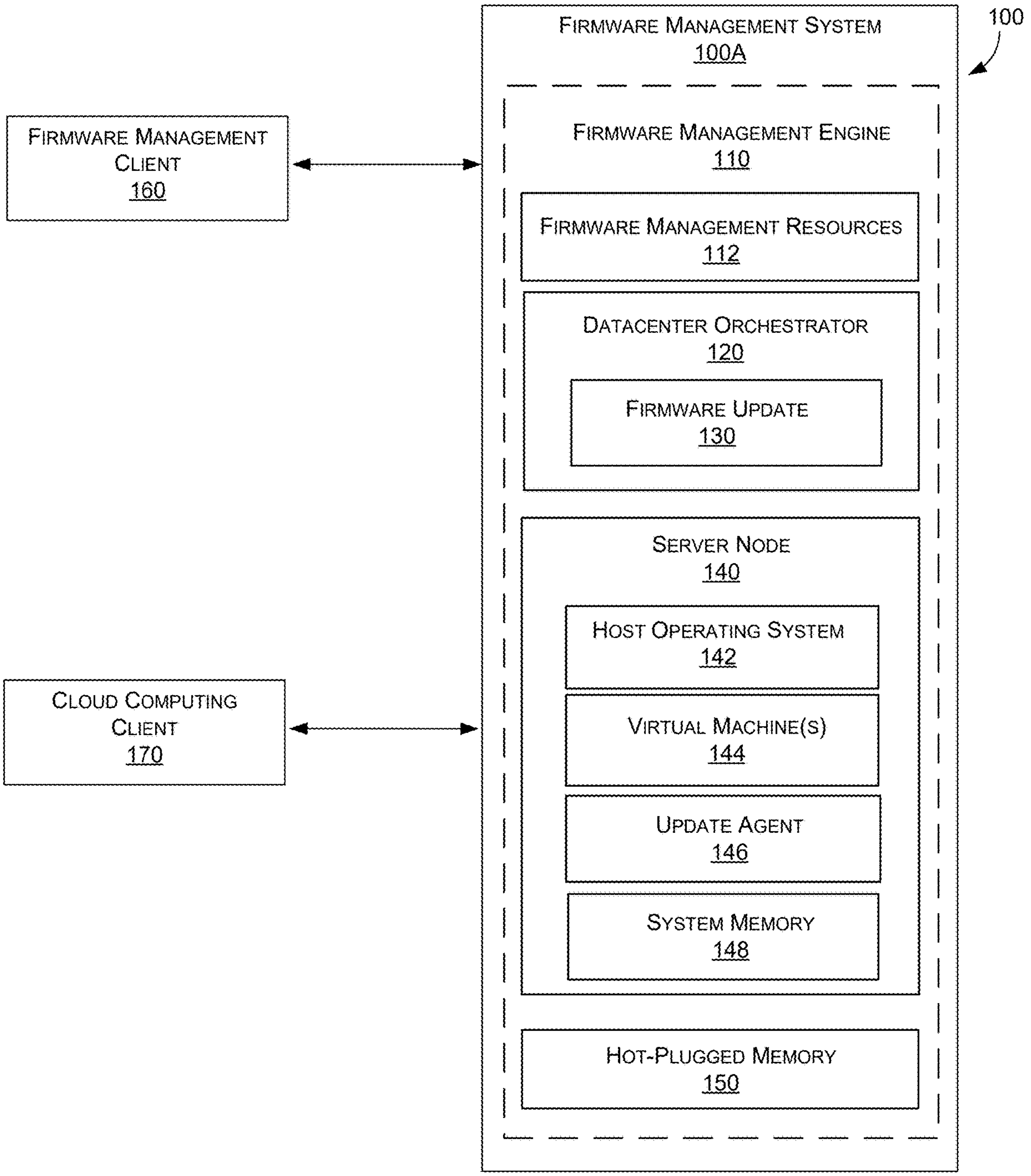
FIGS. 1A-1D are block diagrams of an exemplary cloud computing system including a firmware management engine, in accordance with aspects of the technology described herein.

Firmware is a specialized type of software that provides low-level control for hardware components. It is typically stored in non-volatile memory (such as flash memory) within a hardware device (e.g., firmware code in a server), allowing the firmware to remain intact even when the hardware device is powered off. Firmware for a server, often part of the BIOS/UEFI (Basic Input/Output System/Unified Extensible Firmware Interface) is responsible for initializing memory (e.g., Dynamic Random Access Memory "DRAM") during the boot process.

By way of illustration, during a server's boot process, the firmware (BIOS or UEFI) initializes the DRAM. This involves running a Power-On Self Test (POST) to check and verify that the memory modules are functioning correctly. The firmware detects the presence, size, and type of DRAM installed in the server. It configures the memory timings, speeds, and other parameters to ensure optimal performance and compatibility. The firmware provides settings that allow users to configure various aspects of the DRAM, such as frequency, voltage, and latency. These settings can often be accessed and modified through the BIOS/UEFI interface. The firmware establishes the memory map, which is a vital step in system boot-up. It defines how the system's physical memory is allocated and accessed by the operating system and applications.

Firmware updates can include enhancements to improve memory compatibility and performance. They may address issues with specific memory modules or improve overall system stability. In particular, performing periodic firmware (e.g., memory reference code) updates and restarts to retrain memory is a common practice among hyper scalars (large-scale cloud service providers "cloud providers") to optimize the performance, stability, and margin of DRAM. This approach aims to fine-tune memory parameters, such as timing, voltage, and signal integrity, to achieve the best possible operating conditions and ensure optimal performance for their massive-scale infrastructure. By periodically updating the memory reference code firmware and restarting servers to retrain the memory, hyper scalars can enhance memory reliability, mitigate potential issues, and optimize system performance.

Server system DRAM modules are typically connected either directly to the CPU memory controller or via the CPU CXL (Compute Express Link) interface. In both scenarios, the memory initialization firmware typically runs only during system boot. This limitation is due to the intrusive nature of memory training, which involves adjusting memory parameters such as timing, voltage, and signal integrity to optimize performance. Running memory training routines outside of the boot process could potentially disrupt the data stored in memory, leading to instability and potentially damaging the data integrity of applications, virtual machines (VMs), or the operating system (OS). Therefore, to ensure the stability of the system and protect against data corruption, memory training is typically performed only during system initialization, allowing for a controlled environment where potential risks can be mitigated.

Cloud providers often adopt an update and activation model for memory initialization firmware code, which necessitates a server restart. This restart dependency presents challenges, especially in environments where uninterrupted service is paramount. To address this, cloud provider leverage technologies like VM live migration, allowing for the seamless movement of virtual machines (VMs) from one physical server to another without disrupting ongoing operations. By orchestrating VM live migration alongside memory reference code updates, hyper scalars can minimize downtime and maintain service continuity. This approach enables them to deliver necessary firmware updates while ensuring the stability and reliability of their infrastructure, essential for meeting the demanding requirements of their cloud services and maintaining a consistent user experience.

While VM live migration can minimize downtime during firmware updates, several potential downsides warrant consideration. The VM live migration process may introduce temporary performance degradation due to resource allocation for migration, exacerbate network congestion, and escalate resource contention, particularly in heavily loaded environments. The complexity of managing live migrations at scale can burden administrators, and dependency on network stability poses a risk of migration failures or delays. Security concerns arise from data transmission over the network, and compatibility issues may restrict interoperability across different virtualization platforms. Additionally, high-performance workloads may suffer from degraded performance, and unexpected issues during migration could disrupt VMs, despite the intention to maintain service continuity. Careful planning and mitigation strategies are necessary to address these challenges and ensure successful firmware updates without compromising service availability or performance. As such, a more comprehensive cloud computing system—with an alternative basis for performing firmware management operations—can improve computing operations and interfaces in cloud computing systems.

Description of Technical Solution

At a high level, firmware management resources via a firmware management system that supports firmware management in a cloud computing system. Firmware management refers to updating the memory initialization firmware that involves modifying the code stored in nonvolatile memory, which could be a flash memory chip embedded on a server's motherboard or a similar storage device. This firmware code controls the initialization process of both nonvolatile memory, which retains its data even when power is removed, and volatile main memory (MM), which includes both system memory (DRAM) and memory controller configurations. During the boot process, the firmware executes instructions stored in nonvolatile memory to initialize the volatile memory and associated memory controllers, ensuring proper operation and compatibility with the system. Updating this firmware typically involves flashing new firmware code to the nonvolatile memory, which may require a dedicated update tool or utility provided by the hardware manufacturer.

The firmware management resources for firmware management can include a hot-plugged memory. For example, CXL pooled memory that is shared at the rack level. The hot-plugged memory supports temporarily migrating the memory contexts of system memory (e.g., CPU local memory or CXL attached memory) while performing firmware management. Hot swapping or hot plugging refers to the ability to connect or disconnect a device from a computer system while the system is running or "hot" without the need to shut down or restart the system. This capability allows for the addition or removal of hardware components, such as peripheral devices or storage drives, without interrupting system operation. Hot plugging is commonly used in various scenarios to add or replace hardware components on-the-fly, providing flexibility, convenience, and minimizing downtime.

An example rack (e.g., rack 100B) can include compute nodes (e.g., compute nodes 120B) and a hot-plugged memory node (e.g., CXL node 130B). Within this setup, compute nodes, individual servers or machines housed in the rack, operate autonomously with their own CPU(s), memory, storage, and networking components, collectively handling processing tasks and computations. These nodes, typically configured with local memory directly attached to the CPU(s), ensure fast access and efficient data processing. Complementing the compute nodes is the CXL node 120B, a dedicated resource within the rack equipped with additional memory and potentially other accelerators, accessible through the high-speed CXL interconnect. This integration augments memory capacity and bandwidth, facilitating scalability beyond local memory limitations and enabling dynamic allocation of memory resources across compute nodes. The CXL interface facilitates rapid data transfer and resource sharing between nodes, optimizing system performance and flexibility while accommodating diverse workload demands. In practical terms, this configuration allows for seamless memory expansion and efficient resource utilization, ensuring high performance and adaptability in data-intensive computing environments.

A server (i.e., compute node) in the rack is associated with a CPU socket that is the physical interface on the motherboard that houses the CPU and connects it to memory and other devices. CPU local memory, typically in the form of DRAM, is directly connected to the CPU through this socket, offering the fastest and lowest-latency access for the CPU due to its proximity and direct connection. In contrast, CXL (Compute Express Link) attached memory is connected via a high-speed, low-latency interconnect, allowing memory to be shared across multiple CPUs and devices, providing greater flexibility and scalability. While CPU local memory provides immediate, high-speed access for frequently used data and instructions, CXL attached memory helps overcome memory bandwidth limitations and expands memory capacity, making it ideal for large-scale, memory-intensive applications. Together, they create a balanced memory hierarchy that leverages the strengths of both local and extended memory resources.

Servers require firmware updates to address security vulnerabilities, improve system stability, add new features, and enhance compatibility with hardware components and software applications. These updates often include patches and fixes for known security vulnerabilities, ensuring that servers remain protected against emerging threats. Additionally, firmware updates may optimize server performance, address hardware compatibility issues, and introduce new functionality or features to meet evolving business needs. Firmware management for firmware updates can include updating and activating new memory initialization firmware code using a firmware management engine. Management (e.g., servicing, updating, and activating) memory initialization firmware code for server systems is complex and poses several challenges. In particular, minimizing user impact and downtime during server firmware updates can introduce some technical challenges. Firmware management can further include retraining the memory with the new firmware. The firmware management engine enables hot swapping or hot plugging the hot-plugged memory (e.g., CXL pooled memory) to a server node that is receiving new memory initialization firmware. Before updating and retraining the memory with the new updated firmware, the firmware management engine migrates system memory (e.g., CPU socket memory-local, onboard CXL memory) to the hot-plugged memory.

In addition, VMs can be frozen and unfrozen to temporarily operate with the hot-plugged memory. Freezing and unfreezing a virtual machine (VM) involves pausing and resuming its execution, respectively, which are essential operations in virtualization environments for effective management and maintenance. When a VM is frozen, its current state, including memory contents, CPU registers, and active I/O operations, is preserved exactly as it is, halting all processes and ensuring no CPU resources are consumed, though memory remains occupied. This state is particularly useful during system maintenance, resource management, or when creating consistent snapshots or backups, as it ensures the VM can be paused without disrupting its operational integrity. Unfreezing the VM resumes its execution from the exact point where it was frozen, restoring all preserved states and continuing processes seamlessly, thus resuming normal CPU and resource usage. These operations can be managed by the hypervisor, such as VMware ESXi, Microsoft Hyper-V, or KVM, and are critical for minimizing downtime during maintenance and ensuring operational continuity without the need for rebooting or reinitializing the VM.

System memory data is migrated to the hot-plugged memory prior to the firmware management operations and then hot-plugged memory data is migrated to the system memory after the firmware management operations have been completed. Migrating the system memory data or the hot-plugged memory data can include assigning an address map of the memory data being migrated to the corresponding memory (i.e., hot-plugged memory or system memory). By way of context, assigning an address map to memory involves defining how virtual or logical memory addresses used by programs and the operating system are translated into physical memory addresses in the hardware. When transferring migrating memory, the process of assigning an address map involves updating the system's memory management structures to reflect the new physical locations of the data. With the VMs temporarily paused to maintain data consistency, the memory data is migrated. The operating system's page tables are then updated to point to the new physical addresses. After verifying data integrity, operations are resumed, now using the new memory store.

By way of illustration, a VM is frozen and the hot-plugged memory is provided system memory data. A portion of the system memory that is being serviced is removed from an address map. The VM is unfrozen to operate based on the migrated system memory in the hot-plugged memory. A maintenance core (e.g., an idle CPU core) can be employed to run the newly updated firmware. In the alternative, a microcontroller can be employed to run the newly updated firmware to reinitialize and retrain the memory. Upon retraining the memory, the migrated system memory is copied back from the hot-plugged memory to the serviced system memory (e.g., local/onboard CXL attached memory). The VM is frozen to restored memory data from the hot-plugged memory. The VM is unfrozen to operate with the system memory. It is contemplated that this process can be repeated for additional CPU sockets to retrain system. In this way, cloud providers can implement an update and activation model for memory initialization firmware code, which does not necessitate a server restart. As such, memory can be updated on-the-fly without requiring downtime. Decoupling memory updates from server restarts enhances the overall availability, performance, and operational efficiency of virtualized environments, supporting continuous service delivery and minimizing disruptions.

Example Systems and Resources

Figure 1B:
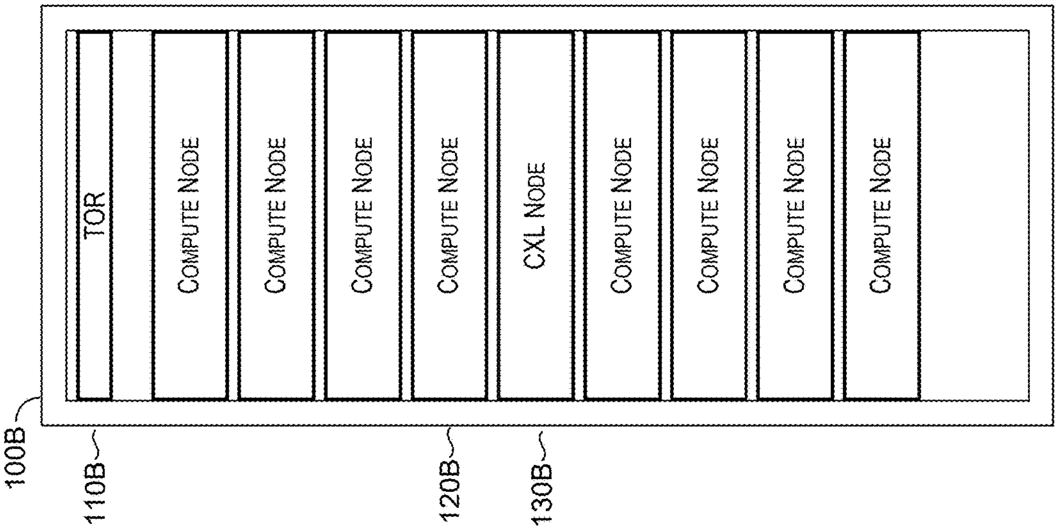
Figure 1C:
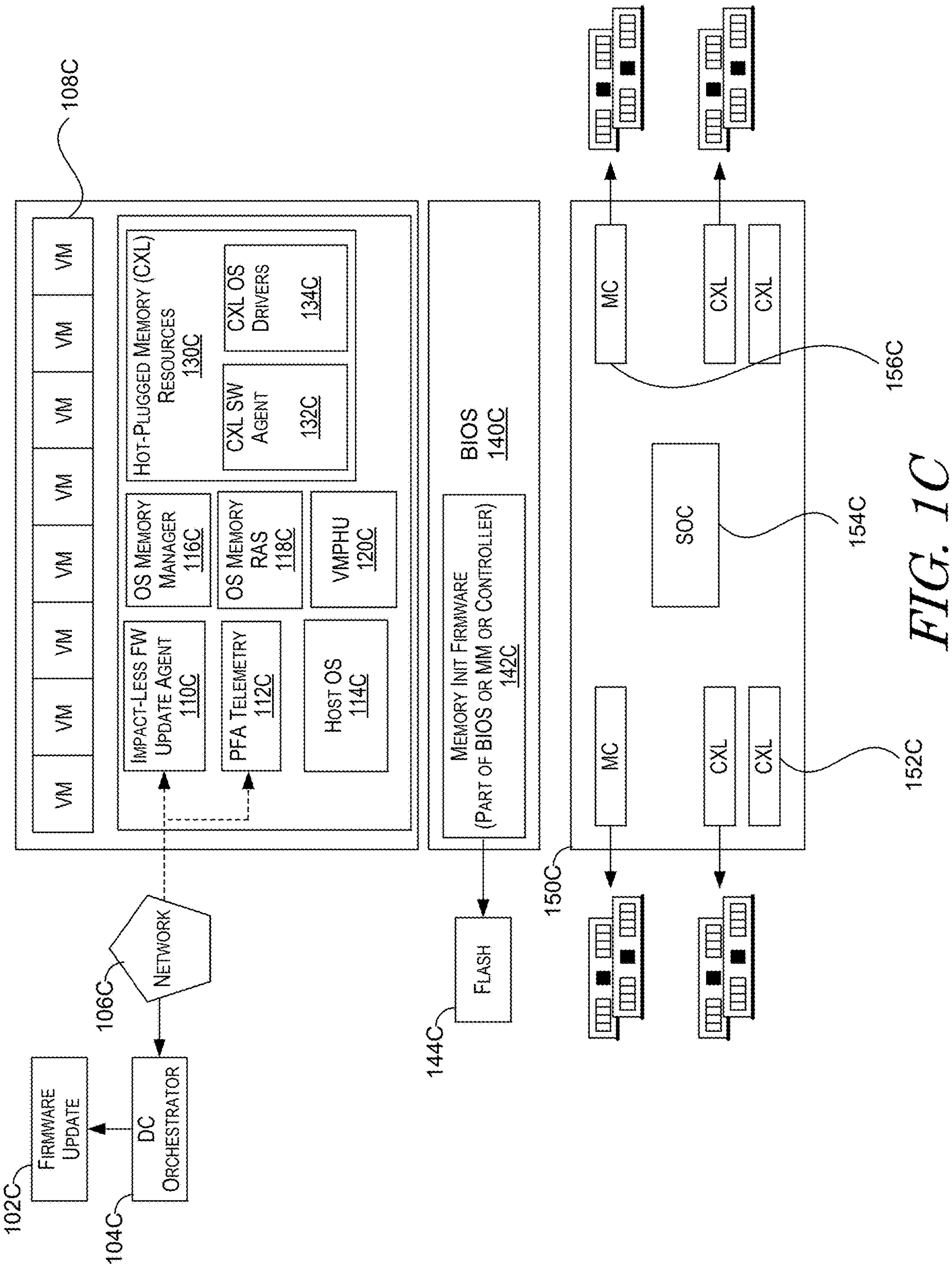

Aspects of the technical solution can be described by way of examples and with reference to FIGS. 1A-1C. FIG. 1A illustrates a cloud computing environment (system) 100, firmware management system 100A, firmware management engine 110, firmware management resources 112, datacenter orchestrator 120 including firmware update 130, server node 140 including host operating system 142, virtual machine 144, update agent 146, system memory 148, hot plugged memory 150, firmware management client 160, and cloud computing client 170.

Cloud computing system 100 includes firmware management client 100A that provides an operating environment for firmware management engine 100 that operates with firmware management client 160 and cloud computing client 170 that operates with virtual machine 144. The firmware management engine 100 operates in conjunction with a firmware management client 160 facilitating the provisioning of firmware management functionality for server node 150. For example, through user interactions via the firmware management client 160, the firmware management engine 110 supports using a hot-plugged memory (e.g., Compute Express Link (CXL) pooled memory) to temporarily migrate system memory (e.g., Central Processing Unit (CPU) local memory or CXL attached memory) of a server node, while performing firmware management operations (e.g., a firmware update) on the server node.

Firmware management resources 112 encompasses various operations, interfaces, and data associated with firmware management functionality. Operations can include firmware updates, system reboots, and memory training. Firmware updates involve preparing, installing, verifying, and potentially rolling back updates to ensure they are correctly applied and the system functions as expected. System reboots are necessary to apply new firmware settings and require careful planning to minimize disruption to active VMs. Memory training is performed during system boot to optimize memory performance and stability. The interfaces involved in this process include management consoles, command-line interfaces (CLIs), APIs, and out-of-band management tools. Management consoles provide a graphical interface for scheduling and monitoring updates, while CLIs offer direct control and automation capabilities. APIs enable integration with other management systems, and out-of-band management tools allow for firmware updates even when the server is offline or unresponsive. The data implicated in firmware management consists of firmware binaries, configuration files, logs, backup data, and VM state information. Firmware binaries are the actual update files, configuration files store system settings, logs provide records of update activities, backup data ensures recovery in case of failures, and VM state information is crucial for maintaining VM integrity during updates.

With reference to FIG. 1C, FIG. 1C illustrates an example technical solution environment associated with firmware management using a firmware management engine. The operating environment includes firmware update 120, datacenter (DC) orchestrator 104C, network 106C, a plurality of VMs 180C, an impact-less firmware (FW) update agent 110C, PFA (Predictive Failure Analysis telemetry) 112C, host operating system (OS) 114C, OS Memory Manager 116C, Operating System Memory Reliability Availability and Serviceability 118C, VMPHU (Virtual Machine Preserving Host Updates) 120C hot-plugged memory resource 130C including CXL Software Agent 132C, and CXL OS Drivers 134C.

The OS memory manager 116C of the host OS 114C is responsible for allocating, managing, and optimizing the use of system memory among various processes and applications. OS memory manager RAS 118C refers to the features and techniques implemented within the OS memory manager 116C to ensure memory operations are reliable, the system remains available during faults, and maintenance can be performed efficiently. The host OS 114C is the primary operating system installed on a server node, which manages hardware resources and provides services to guest operating systems running in virtual machines (e.g., plurality of VMs 108C).

VMPHU (Virtual Machine Preserving Host Updates) 120C is a software unit that supports virtualization where updates or patches are applied to the underlying host system (the physical server running the virtual machines) without requiring the virtual machines (VMs) to be shut down or migrated. In this way, the VMPHU enables freezing and unfreezing of VMs. PFA (Predictive Failure Analysis) 112C on a server node is a proactive feature that monitors and analyzes system components, including memory, to predict and alert on potential failures before they occur, enhancing system reliability and uptime.

Hot-plugged memory CXL resources 130 includes CXL SW 132C that manages communication and data flow between the CPU and CXL-connected devices, ensuring efficient resource utilization and performance optimization. CXL OS drivers 134C are low-level software components that enable the operating system to recognize, interface with, and control CXL devices, providing necessary functionalities and support for hardware interactions.

A motherboard 150C can be associated with CXL 152 that operates as a high-speed interconnect that enhances communication between the CPU and other components that is integrated within SoC (System on Chip) 154C. SoC 154C typically memory controller (MC) 156C and other essential subsystems on a single chip, optimizing performance and efficiency. The memory controller 156C within the SoC 154C manages data flow between the CPU and RAM, and with CXL 152C.

The technical solution environment provides computing systems for orchestrating a range of critical operations to streamline firmware management. At its core, a firmware management engine provides orchestration that extends to deployment and update operations, where the firmware management engine seamlessly coordinates the download, installation of firmware updates, and prioritizing impact-less firmware update functionality in firmware management practices.

By way illustration, the existing state (e.g., a current state) of one or more virtual machines (VMs) can be running or idle. Alternatively, a host instance (i.e., host OS 114C) may operate without VMs (i.e., the plurality of VMs 108C). An orchestrator (e.g., a fabric controller-DC orchestrator 104C) that manages hardware and applications in computing cluster can push a firmware update (e.g., new memory initialization firmware update-firmware update 102C) to an agent (i.e., impact-less FW update agent 110C). The agent supports firmware management functionality for the host. The agent receives the firmware update from the orchestrator. The agent updates the firmware in a system control memory (e.g., flash 144C associated with controller memory or management mode memory 142 in BIOS (Basic Input/Output System) 140C). The orchestrator employs a remote rack level Application Programming Interface (API) attaches the hot-plugged memory (e.g., a CXL pooled memory) to a server node associated with the firmware update.

The agent running on the host freezes a VM, and copies memory content from system memory (e.g., CPU socket-local/onboard CXL memory) to the hot-plugged memory. The agent assigns an address range to the hot-plugged memory (i.e., the address range associated with the system memory) to ensure that the VM operates with the system memory and corresponding address range. The agent unfreezes the VM to operate with the hot-plugged memory. The agent causes the firmware update to be performed. The newly updated memory initialization firmware can be deployed either by pinging a memory controller or using a CPU core to run the memory initialization code from the system control memory. The memory initialization code reforms full memory training. Upon completion of the memory training, the agent receives a signal that the memory training has been completed. The agent freezes the VM. The agent copies memory contents from the hot-plugged memory to the system memory. The agent assigns an address range of the hot-plugged memory to the system memory. The agent unfreezes the second VM. The agent can utilize the hot-plugged memory to one or more system memory instances associated with the same server or other servers.

Figure 1D:
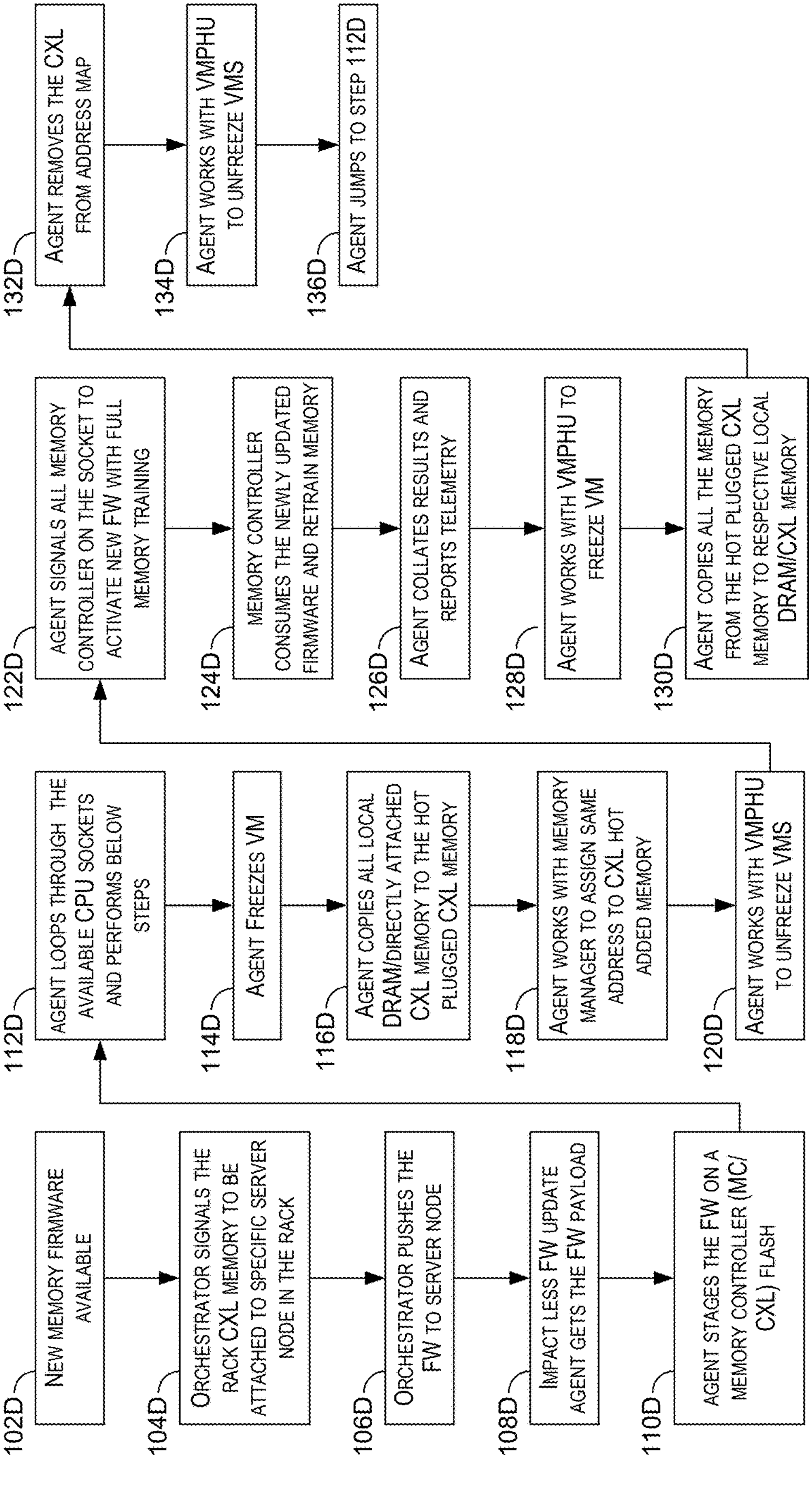

With reference to FIG. 1D, FIG. 1D illustrates an example flow diagram associated with providing firmware management using a firmware management engine. At block 102D, new memory firmware (FW) becomes available. At block 104D, an orchestrator signals a rack CXL memory to be attached to a specific server node in the rack. At block 106D, the orchestrator pushes the FW to the server node. At block 108D, impact-less FW update agent gets the FW payload. At block 110D, the impact-less FW update agent stages the FW on a memory controller flash. At block 112D, the impact-less agent ("agent") loops through all the available CPU sockets and performs steps at blocks 114D-136D.

At block 114D, the agent freeze a VM. At block 116D, the agent copies local DRAM and directly attached CXL memory to a hot-plugged CXL memory. At block 118D, the agent works with memory manager to assign address of local DRAM and attached CXL memory to CXL hot-plugged memory. At block 120D, the agent works with VMPHU to unfreeze the VM. At block 122D, the agent signals a memory controller on the socket to activate the new FW with full memory agent. At block 126D, the memory controller initializes the newly updated firmware and retrains the memory. At block 126D, the agent collates results and reports telemetry. At block 128D, the agent works with the VMPHU to freeze the VM. At block 130, the agent copies content form the hot-plugged CXL memory to respective local DRAM/CXL memory. At block 132D, the agent removes the CXL from the address. At block 134D, the agent works with the VMPHU to unfreeze the VM. At block 136D, the agent cycles through a next CPU socket. Each socket on a motherboard allows for the installation of an individual central processing unit (CPU) and each provides an interface through which the CPU communicates with other system components, including memory, peripherals, and the rest of the motherboard.

Figure 2:
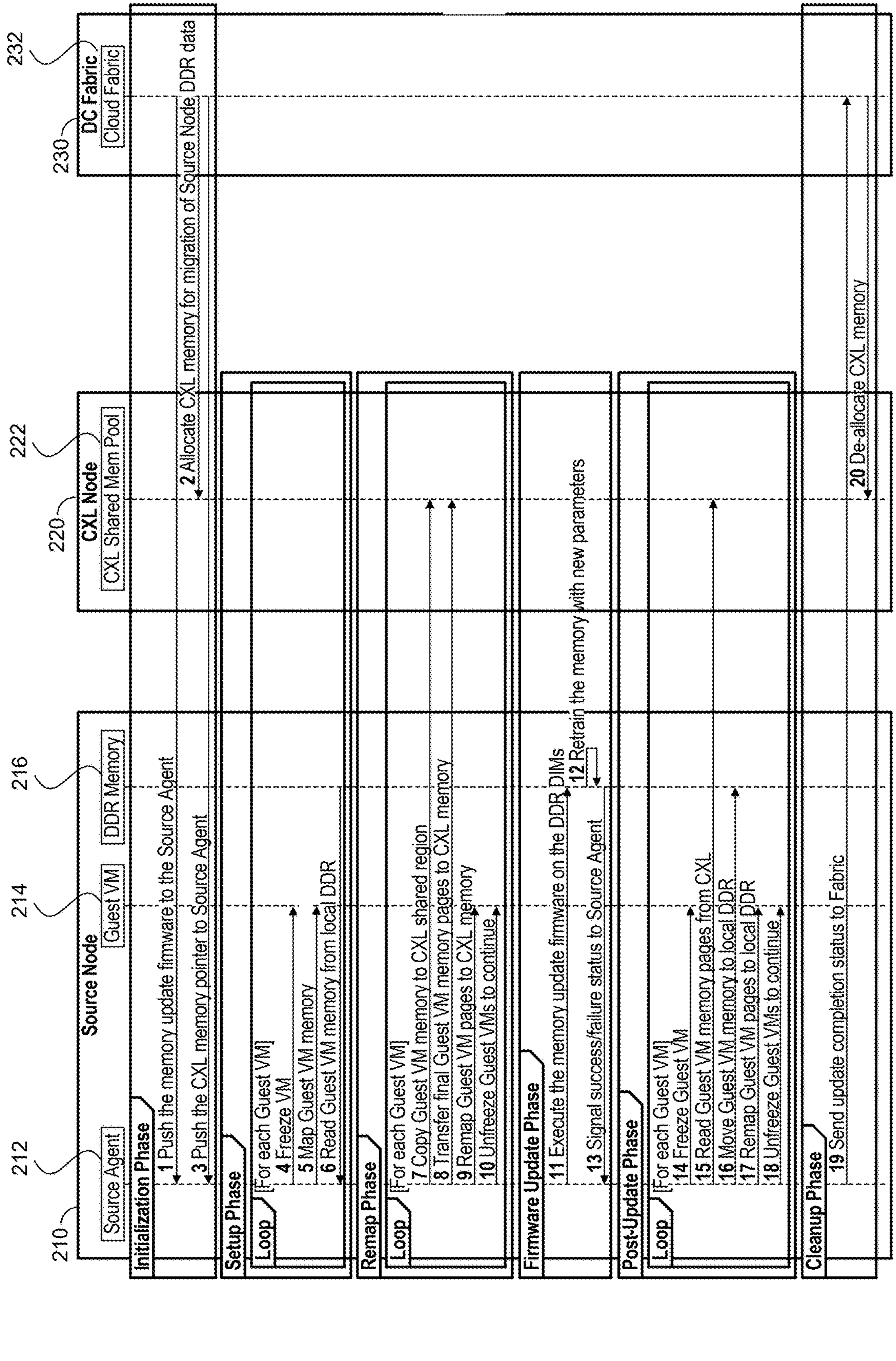
FIG. 2 is a block diagram of an exemplary cloud computing system including a firmware management engine, in accordance with aspects of the technology described herein.

With reference to FIG. 2, FIG. 2 illustrates an example flow diagram associated with providing firmware management using a firmware management engine. The firmware management engine including a source node 210 having a source agent 212, guest VM 214, and DDR memory 216, CXL node 220 having CXL shared memory pool 222, and a datacenter fabric 230 having a cloud fabric 232.

Initialization phase includes step 1: push the memory update firmware to source agent 212; step 2: allocate CXL memory for migration of source node DDR data; and step 3, push the CXL memory pointer to source agent 212.

Setup phase (e.g., a loop setup phase) includes step 4: freeze VM; step 5: map guest VM 214 memory; and step 6: read guest VM memory from local DDR.

Remap phase (e.g., a loop remap phase) includes for each VM, step 7: copy guest VM 214 memory to CXL shared region (e.g., CXL shared mem pool 222 on CXL node 220);

at step 8: transfer final guest VM 214 memory pages to CXL memory; step 9: remap guest VM 214 pages to CXL memory; step 10: unfreeze guest VMs to continue.

Firmware update phase includes step 11: execute the memory update firmware on the DDR memory 216 DIMS; step 12: retrain the memory with new parameters; and step 13, signal success/failure status to source agent 212.

Post-update phase (e.g., loop post-update phase) includes step 14, freeze guest VM 214, read guest VM 214 memory pages from CXL; step 16: move guest VM memory to local DDR; step 17: remap guest VM pages to local DDR; and step 18: unfreeze guest VMs to continue.

Cleanup phase includes, at step 19: send update completion status to fabric; and at step 20: de-allocate CXL memory.

Aspects of the technical solution have been described by way of examples and with reference to FIGS. 1A-1C and 2. FIG. 1A is a block diagram of an exemplary technical solution environment, based on example environments described with reference to FIGS. 6, 7 and 8 for use in implementing embodiments of the technical solution are shown. Generally the technical solution environment includes a technical solution system suitable for providing the example AI backend network system 100 in which methods of the present disclosure may be employed. In particular, FIG. 1A illustrates a high level architecture of the AI backend network system 100 in accordance with implementations of the present disclosure, among other engines, managers, generators, selectors, or components not shown (collectively referred to herein as "components").

Example Methods

Figure 3:
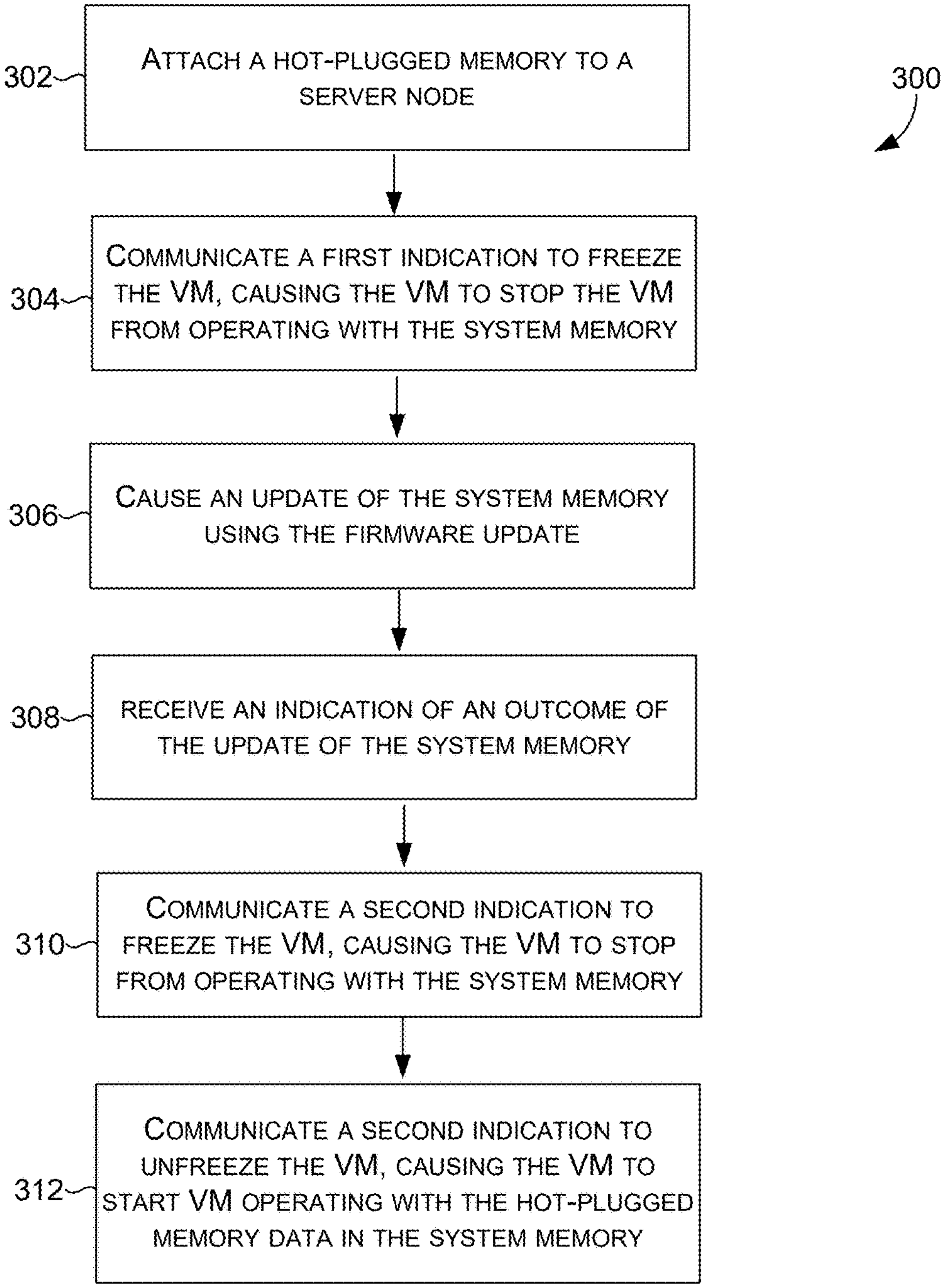
FIG. 3 provides a first exemplary method of providing firmware management using a firmware management engine, in accordance with aspects of the technology described herein.
Figure 4:
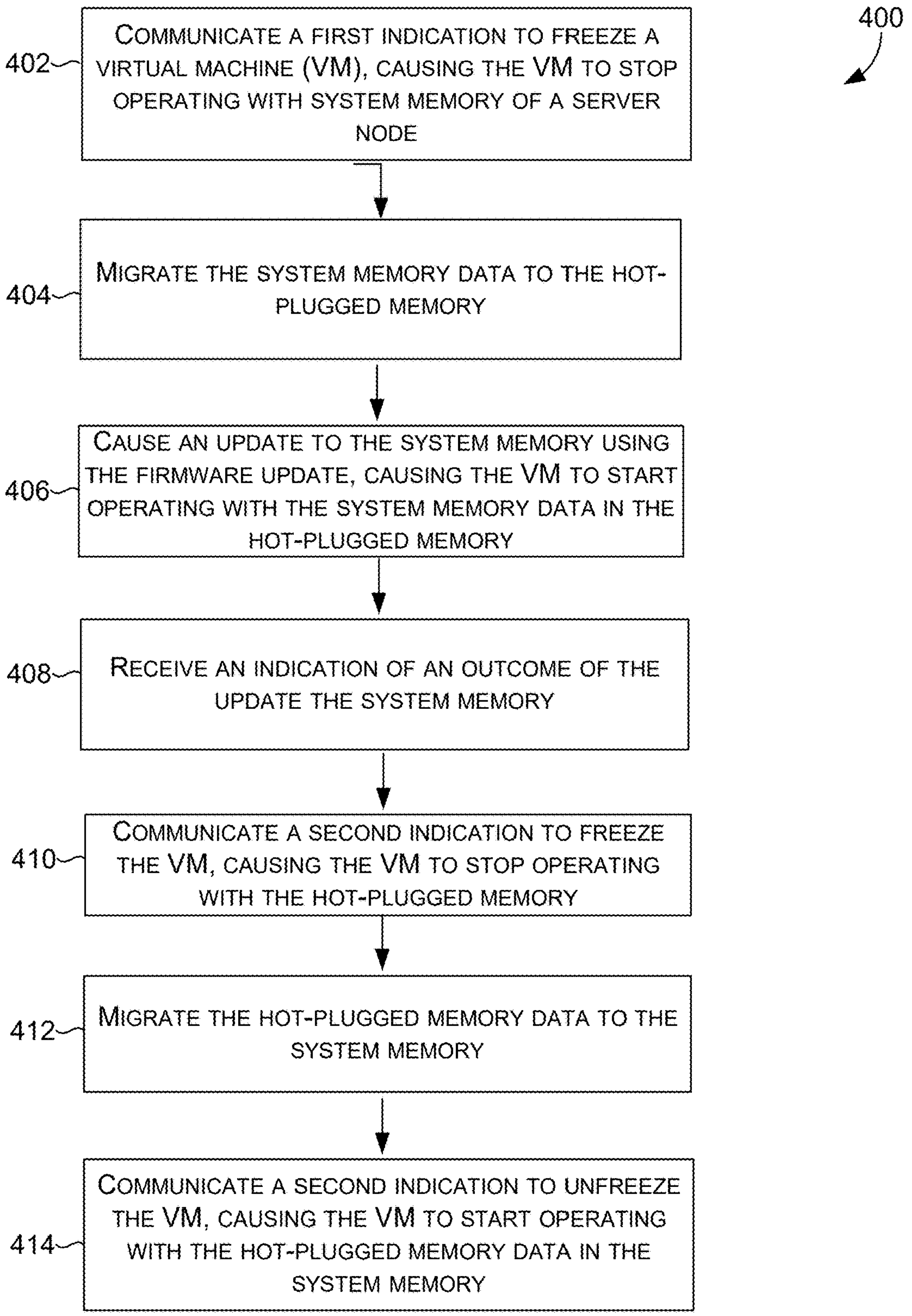
FIG. 4 provides a second exemplary method of providing firmware management using a firmware management engine, in accordance with aspects of the technology described herein.
Figure 5:
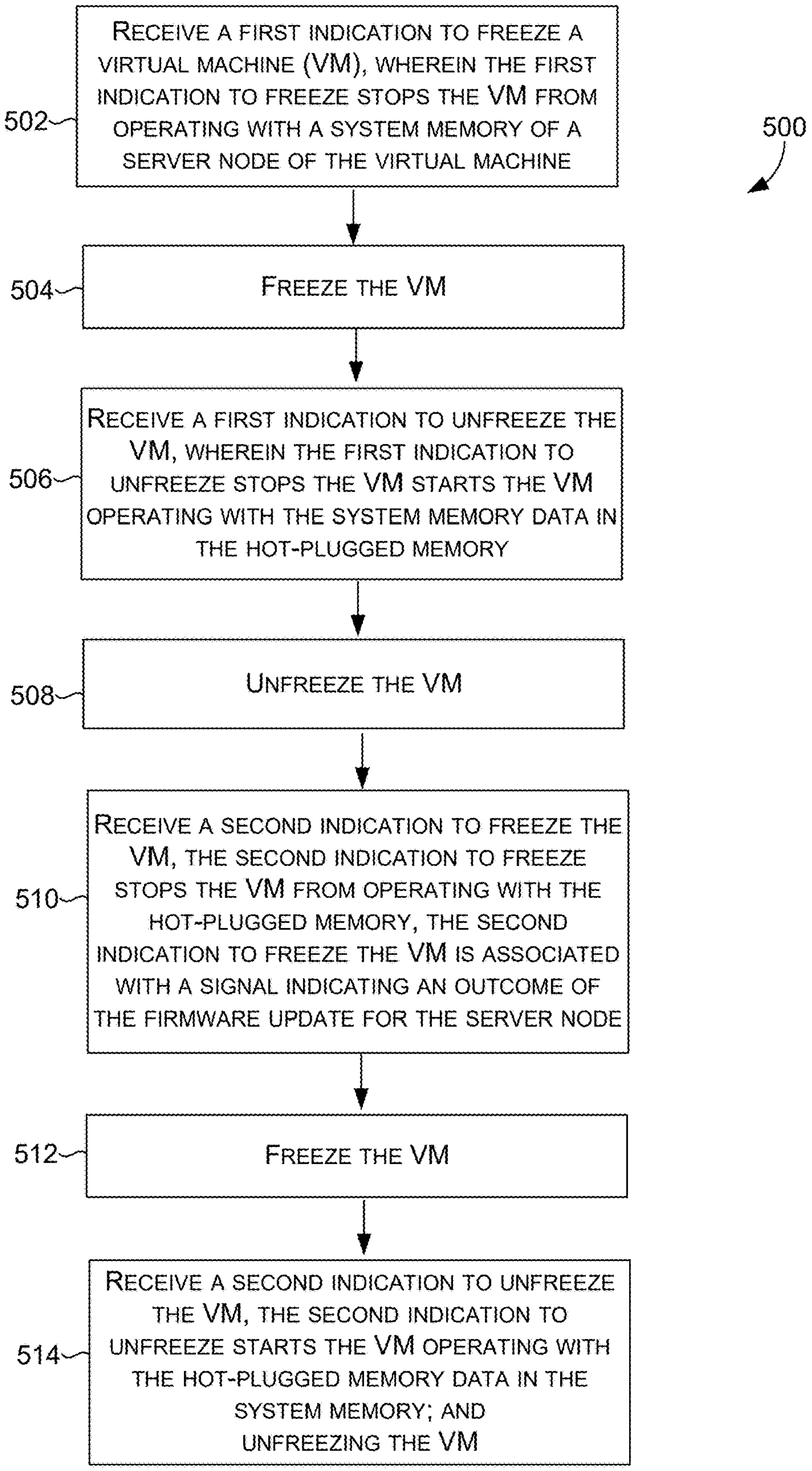
FIG. 5 provides a third exemplary method of providing firmware management using a firmware management engine, in accordance with aspects of the technology described herein.

With reference to FIGS. 3, 4, and 5, flow diagrams are provided illustrating methods for providing firmware management using a firmware management engine in a cloud computing system. The methods may be performed using the cloud computing system described herein. In embodiments, one or more computer-storage media having computer-executable or computer-useable instructions embodied thereon that, when executed, by one or more processors can cause the one or more processors to perform the methods (e.g., computer-implemented method) in the cloud computing system (e.g., a computerized system).

Turning to FIG. 3, a flow diagram is provided that illustrates a method 300 for providing firmware management using a firmware management engine in a cloud computing system. At block 302, attach a hot-plugged memory to a server node. The server node is associated with a firmware update for a system memory that stores system memory data, and the system memory data is associated with a virtual machine (VM) of the server node. At block 304, communicate a first indication to freeze the VM, causing the VM to stop operating with the system memory. The first indication to freeze enables migrating the system memory data to the hot-plugged memory. At block 306, communicate a first indication to unfreeze the VM, causing the VM to start operating with the system memory data in the hot-plugged memory. At block 308, cause an update of the system memory using the firmware update. At block 310, receive an indication of the outcome of the system memory update. At block 312, communicate a second indication to freeze the VM, causing the VM to stop operating with the system memory. The second indication to freeze enables migrating hot-plugged memory data to the system memory. At block 314, communicate a second indication to unfreeze the VM, causing the VM to start operating with the hot-plugged memory data in the system memory.

Turning to FIG. 4, a flow diagram is provided that illustrates a method 400 for providing firmware management using a firmware management engine in a cloud computing system. At block 402, communicate a first indication to freeze a virtual machine (VM), causing the VM to stop operating with system memory of a server node, the server node is associated with a firmware update for the system memory, the system memory comprises system memory data associated with the VM. The server node is attached to a hot-plugged memory. At block 404, migrate the system memory data to the hot-plugged memory. At block 406, communicate a first indication to unfreeze the VM, causing the VM to start operating with the system memory data in the hot-plugged memory. At block 408, cause an update to the system memory using the firmware update. At block 410, receive an indication of the outcome of the system memory update. At block 412, communicate a second indication to freeze the VM, causing the VM to stop operating with the hot-plugged memory. At block 414, migrate the hot-plugged memory data to the system memory. At block 416, communicate a second indication to unfreeze the VM, causing the VM to start operating with the hot-plugged memory data in the system memory.

Turning to FIG. 5, a flow diagram is provided that illustrates a method 500 for providing firmware management using a firmware management engine in a cloud computing system. At block 502, receive a first indication to freeze a virtual machine (VM). The first indication to freeze stops the VM from operating with the system memory of a server node, and is associated with a firmware update for the server node and the migration of system memory data to a hot-plugged memory; freeze the VM. At block 504, receive a first indication to unfreeze the VM. The first indication to unfreeze starts the VM operating with the system memory data in the hot-plugged memory. At block 506, unfreeze the VM. At block 508, receive a second indication to freeze the VM. The second indication to freeze stops the VM from operating with the hot-plugged memory and is associated with a signal indicating the outcome of the firmware update for the server node. At block 510, freeze the VM. At block 512, receive a second indication to unfreeze the VM. The second indication to unfreeze starts the VM operating with the hot-plugged memory data in the system memory. At block 514, unfreeze the VM.

Technical Improvement

Embodiments of the present techniques have been described with reference to several inventive features (e.g., operations, systems, engines, and components) associated with a cloud access management system. Inventive features described include: operations, interfaces, data structures, and arrangements of computing resources associated with providing the functionality described herein relative with reference to a hardware-based failure recovery engine. Functionality of the embodiments of the present invention have further been described, by way of an implementation and anecdotal examples—to demonstrate that the operations for providing the connection management engine as a solution to a specific problem in failure recovery management technology to improve computing operations in AI backend network systems.

Advantageously, the firmware management engine empties the CPU local and CXL attached memory to activate the new firmware with live DDR training. Conventional firmware management systems with current operational procedures necessitate a complete system restart, compelling the live migration of customer VMs and workloads. This process significantly impacts the Total Cost of Ownership (TCO) metrics for hyper scalars due to the downtime and resource allocation required for migration tasks. The newly introduced innovation eliminates the requirement for system restarts and renders live migration unnecessary. This advancement represents a substantial improvement in operational efficiency and uptime management for hyper scalars.

Furthermore, the existing approach mandates node restarts to facilitate memory firmware updates. However, the acceptance rate for these updates is notably low. This issue stems from challenges associated with aging System-on-Chip (SoC) and memory components, which necessitate periodic restarts to maintain operational reliability. By adopting the new innovation, these challenges are mitigated, leading to enhanced system stability, reduced downtime, and improved Availability Index Rating (AIR). This holistic approach not only addresses current operational inefficiencies but also lays the groundwork for more robust and reliable infrastructure management in hyper scalar environments.

Additional Support for Detailed Description

Example Computing System in a Computing Environment

Figure 6:
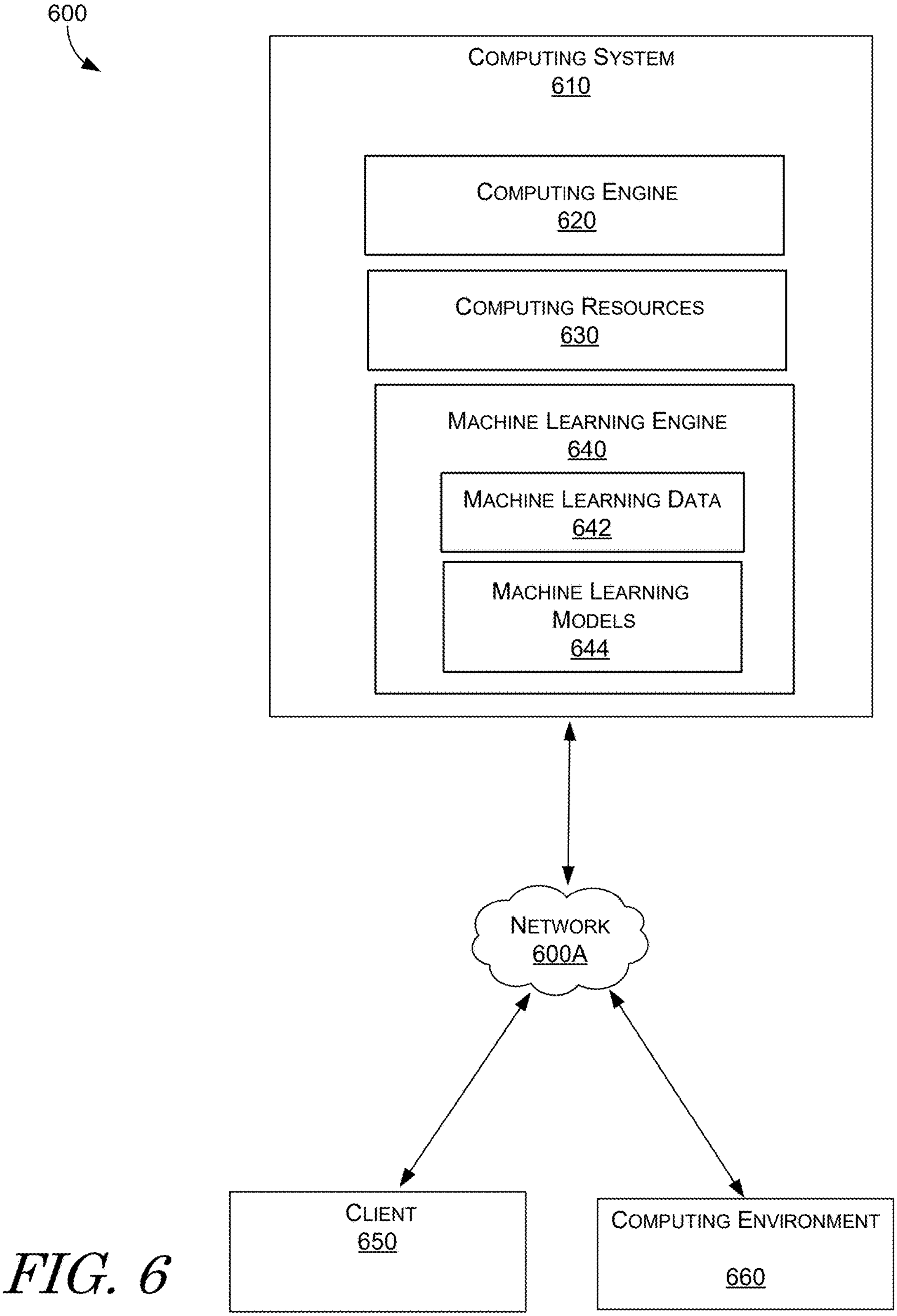
FIG. 6 provides a block diagram of an exemplary cloud computing system suitable for use in implementing aspects of the technology described herein.

Referring now to FIG. 6, FIG. 6 illustrates a computing environment in which implementations of the present disclosure may be employed. In particular, FIG. 6 shows a high level architecture of an example cloud computing platform 600, artificial intelligence (AI) backend network system 600A, and computing system 610 that can host a technical solution environment. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The cloud computing platform 600 provides computing system resources for different types of managed computing environments. For example, the cloud computing platform supports delivery of computing services-including compute, servers, storage, databases, networking, and intelligence. The components of cloud computing environment 600 may communicate with each other over a network 600A which may include, without limitation, one or more local area networks (LANs) and/or wide area networks (WANs).

The cloud computing platform 600 provides the foundational infrastructure and resources for deploying and managing computing workloads, including AI. AI backend network system 600A includes specialized infrastructures tailored for supporting the unique computational demands of AI workloads. The relationship between the two involves resource provisioning, integration, orchestration, and data processing, enabling organizations to leverage cloud-based resources effectively for AI development and deployment.

The computing system 610 provides computing functionality for computing environments. For example, the computing system 610 is a platform or framework that leverages advanced technologies such as artificial intelligence (AI), machine learning (ML), data mining, and big data analytics to extract actionable insights and knowledge from large and complex datasets. In this way, the computing system 610 provides a computing environment that enables organizations to make informed decisions and optimize operations.

The computing system 610 includes a computing engine 620 that is a computing environment that supports executing computational tasks associated with the computing system 610. The computing engine 620 can be a hardware or software component that performs computational operations, such as, mathematical calculations, data processing, and algorithm execution. The computing system 610 integrates computing resources 630 into computing system 610 to effectively provide computing functionality in a computing environment.

The computing resources 630 refer to computing elements (e.g., components, capability, or entities) that collectively enable the computing engine 620 operations. The computing resources 630 encompass a spectrum of computing elements, beginning with the diverse operations the computing resources 630 can perform, ranging from complex computations to data manipulations. Interfaces, an integral part of the computing resources 630, provide the means for both user interaction and seamless integration with external systems, ensuring a dynamic and interactive computing experience. The data facet of the data computing resources 630 involves various types: input data, which is the information provided for processing; processing data, representing the data manipulated during computational tasks; and output data, the results generated by the computing engine 620. In this way, the computing resources 630 support the broader computing engine 620 and computing system 610.

Machine learning engine 640 is a machine learning framework or library that operates as a tool for providing infrastructure, algorithms, capabilities for designing, training, and deploying machine learning models. The machine learning engine 640 can include pre-built functions and APIs that enable building and applying machine learning techniques. The machine learning engine 640 can provide a machine learning workflow from data processing and feature extraction to model training, evaluation, and deployment.

Machine learning data 642 refers to the structured or unstructured information used to train, validate, and test machine learning models. This machine learning data 642 typically comprises input features (also known as independent variables or predictors) and their corresponding target values (also known as dependent variables or labels). Machine learning data 642 can come from various sources, such as databases, sensor readings, text documents, images, audio recordings, or streaming data sources. Machine learning data 642 may require preprocessing, cleaning, and transformation to ensure its suitability for training machine learning models. Additionally, machine learning data 642 is often divided into training, validation, and testing sets to assess the performance and generalization ability of trained models accurately.

Machine learning models 644 are algorithms or mathematical representations that learn patterns and relationships from the provided data to make predictions or decisions without being explicitly programmed. Machine learning models 644 models are trained using the machine learning data 642, where they iteratively adjust their internal parameters or coefficients to minimize prediction errors or maximize performance metrics. Machine learning models 644 can be classified into various types based on their learning algorithms and the nature of the problem they address, including supervised learning models (e.g., regression, classification), unsupervised learning models (e.g., clustering, dimensionality reduction), and reinforcement learning models. Once trained, machine learning models 644 can be deployed in production environments to make predictions on new, unseen data instances. Regular evaluation and monitoring of model performance are essential to ensure their accuracy, reliability, and effectiveness in real-world applications.

The computing client 650 supports access to computing system 610. The computing client 650 can be provided as a user client or an administrator client to support user and administrator functionality associated with the computing environment 660, computing engine 620, or computing system 610. The computing client 650 can also support accessing computing visualizations and causing display of the computing visualization. The computing client 650 can include a computing engine client that supports receiving computing information associated computing engine 620 output from the computing system 610 and causing presentation of the computing information. The computing information can specifically include computing visualizations associated with the computing engine 620 output.

Computing environment 660 is a computing environment that is integrated into the computing system 610. The computing environment 660 is characterized by an infrastructure, where data from various sources within the ecosystem, including servers, networks, applications, sensors, and user interactions, can be aggregated and processed by the computing system 610 to perform computing tasks. The computing environment 660 can be associated with middleware and integration layers facilitate seamless data flow, while computing infrastructure, encompassing cloud-based resources, distributed computing frameworks, and optimized storage systems, supports functionality associated with the computing.

Example Distributed Computing System Environment

Figure 7:
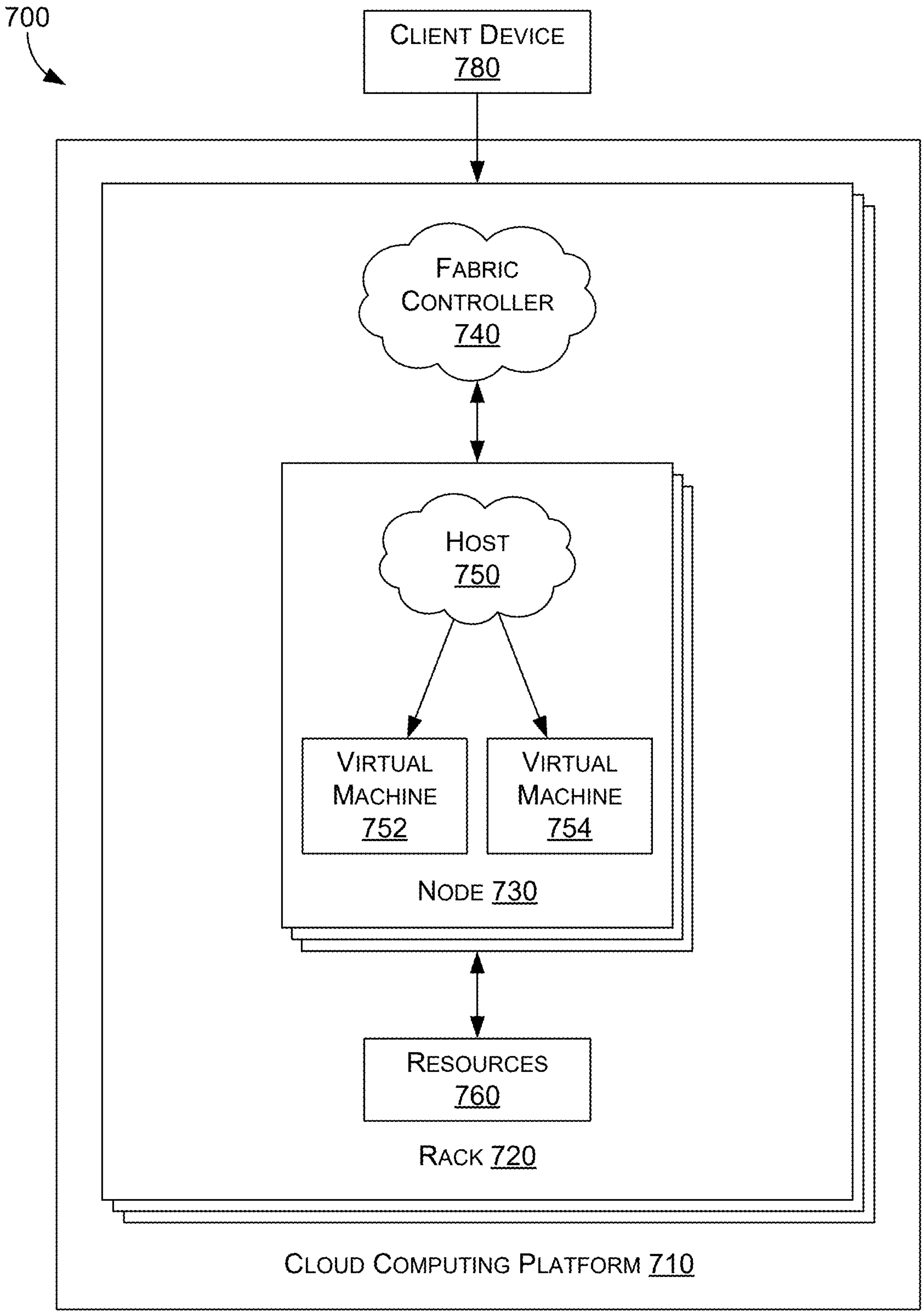
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 780 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
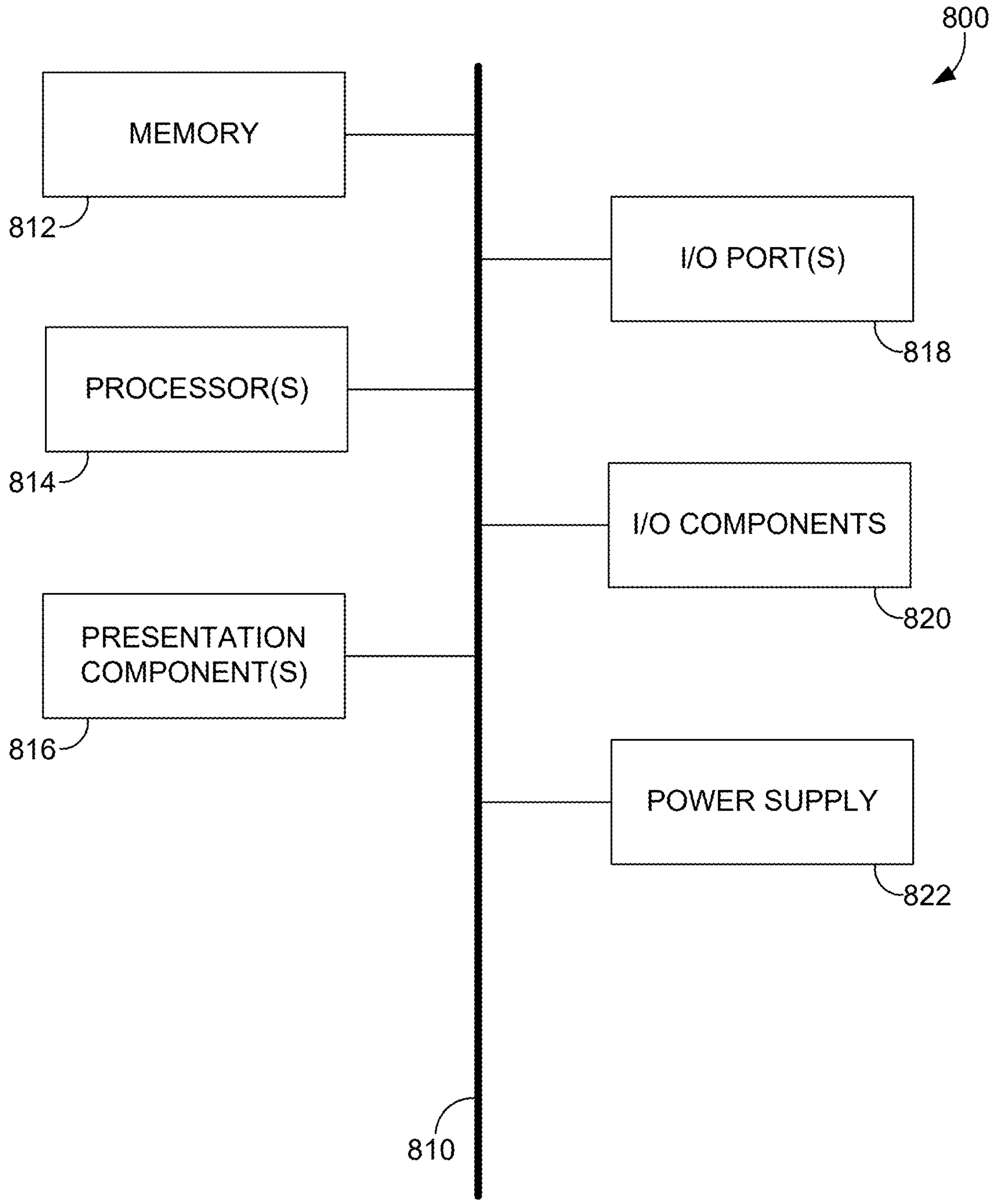
FIG. 8 provides a block diagram of an exemplary computing environment suitable for use in implementing aspects of the technology described herein.

Having briefly described an overview of embodiments of the present technical solution, an example operating environment in which embodiments of the present technical solution may be implemented is described below in order to provide a general context for various aspects of the present technical solution. Referring initially to FIG. 8 in particular, an example operating environment for implementing embodiments of the present technical solution is shown and designated generally as computing device 800. Computing device 800 is but one example of a suitable computing environment and is not intended to suggest any limitation as to the scope of use or functionality of the technical solution. Neither should computing device 800 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present technical solution. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

For purposes of this disclosure the word "support" refers to provisioning of functionality, services, or assistance by a computing component or through computing operations within a broader computing system. When a computing component or set of operations supports a specific functionality, it means that it plays a role in enabling or executing that particular aspect of the computing system. This support can manifest in various ways, including the processing of data, execution of operations, management of resources, and ensuring compatibility or interoperability with other components. Additionally, support may involve providing interfaces, APIs (Application Programming Interfaces), or protocols that allow seamless interaction and integration with other elements of the computing system. The concept of support extends beyond mere functionality provision to encompass maintenance, troubleshooting, and the overall optimization of computing resources to ensure the robust and efficient operation of the computing system.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
- one or more computer processors; and
- computer memory storing computer-useable instructions that, when used by the one or more computer processors, cause the one or more computer processors to perform operations, the operations comprising:
- attaching a hot-plugged memory to a server node, wherein the server node is associated with a firmware update for a system memory that stores system memory data, the system memory data is associated with a virtual machine (VM) of the server node;
- communicating a first indication to freeze the VM, causing the VM to stop the VM from operating with the system memory, wherein the first indication to freeze enables migrating the system memory data to the hot-plugged memory;
- communicating a first indication to unfreeze the VM, causing the VM to start operating with the system memory data in the hot-plugged memory;
- causing an update of the system memory using the firmware update;
- receiving an indication of an outcome of the update of the system memory;
- communicating a second indication to freeze the VM, causing the VM to stop from operating with the system memory, wherein the second indication to freeze enables migrating hot-plugged memory data to the system memory; and
- communicating a second indication to unfreeze the VM, causing the VM to start VM operating with the hot-plugged memory data in the system memory.

2. The system of claim 1, wherein the hot-plugged memory is Compute Express Link (CXL) pooled memory shared at a rack level.

3. The system of claim 1, wherein the system memory is a Central Processing Unit (CPU) local memory or a CXL attached memory.

4. The system of claim 1, wherein the firmware update is new memory initialization firmware code.

5. The system of claim 1, wherein the hot-plugged memory enables the VM to stay operational temporarily using the hot-plugged memory, while firmware management operations are performed on the system memory.

6. The system of claim 1, the operations further comprising:
- upon freezing the VM based on the first indication to freeze the VM, migrating the system memory data to the hot-plugged memory; and
- upon freezing the VM based on the second indication to freeze the VM, migrating the hot-plugged memory data to the system memory.

7. The system of claim 1, wherein migrating the system memory data to the hot-plugged memory comprises:
- assigning an address map of the system memory data to the hot-plugged memory; and
- migrating the hot-plugged memory data to the system memory.

8. One or more computer-storage media having computer-executable instructions embodied thereon that, when executed by a computing system having a processor and memory, cause the processor to perform operations, the operations comprising:
- communicating a first indication to freeze a virtual machine (VM), causing the VM to stop operating with system memory of a server node, the server node is associated with a firmware update for the system memory, the system memory comprises system memory data associated with the VM, wherein the server node is attached to a hot-plugged memory;
- migrating the system memory data to the hot-plugged memory;
- communicating a first indication to unfreeze the VM, causing the VM to start operating with the system memory data in the hot-plugged memory;
- causing an update to the system memory using the firmware update;
- receiving an indication of an outcome of the update the system memory;
- communicating a second indication to freeze the VM, causing the VM to stop operating with the hot-plugged memory;
- migrating the hot-plugged memory data to the system memory;

communicating a second indication to unfreeze the VM, causing the VM to start operating with the hot-plugged memory data in the system memory.

9. The media of claim 8, wherein the hot-plugged memory is Compute Express Link (CXL) pooled memory shared at a rack level.

10. The media of claim 8, wherein the system memory is a Central Processing Unit (CPU) local memory or a CXL attached memory.

11. The media of claim 8, wherein the firmware update is new memory initialization firmware code.

12. The media of claim 8, wherein the hot-plugged memory enables the VM to stay operational temporarily using the hot-plugged memory, while firmware management operations are performed on the system memory.

13. The media of claim 8, wherein migrating the system memory data to the hot-plugged memory comprises assigning an address map of the system memory data to the hot-plugged memory.

14. The media of claim 8, wherein migrating the hot-plugged memory data to the system memory further comprising comprises assigning an address map of the hot-plugged data to the system memory.

15. A computer-implemented method, the method comprising:

receiving a first indication to freeze a virtual machine (VM), wherein the first indication to freeze stops the VM from operating with a system memory of a server node of the virtual machine, wherein the first indication to freeze is associated with a firmware update for the server node and migration of system memory data in the system memory to a hot-plugged memory;

freezing the VM;

receiving a first indication to unfreeze the VM, wherein the first indication to unfreeze stops the VM starts the VM operating with the system memory data in the hot-plugged memory;

unfreezing the VM;

receiving a second indication to freeze the VM, the second indication to freeze stops the VM from operating with the hot-plugged memory, the second indication to freeze the VM is associated with a signal indicating an outcome of the firmware update for the server node;

freezing the VM;

receiving a second indication to unfreeze the VM, the second indication to unfreeze starts the VM operating with the hot-plugged memory data in the system memory; and unfreezing the VM.

16. The method of claim 15, wherein the hot-plugged memory is Compute Express Link (CXL) pooled memory shared at a rack level.

17. The method of claim 15, wherein the system memory is a Central Processing Unit (CPU) local memory or a CXL attached memory.

18. The method of claim 15, wherein the firmware update is new memory initialization firmware code.

19. The method of claim 15, wherein the hot-plugged memory enables the VM to stay operational temporarily using the hot-plugged memory, while firmware management operations are performed on the system memory.

20. The method of claim 19, wherein firmware management operations comprise retraining the system memory with the firmware update.

* * * * *